(12) United States Patent
Zhu et al.

(10) Patent No.: US 11,474,247 B2
(45) Date of Patent: Oct. 18, 2022

(54) METHODS AND SYSTEMS FOR COLOR POINT CLOUD GENERATION

(71) Applicant: BEIJING DIDI INFINITY TECHNOLOGY AND DEVELOPMENT CO., LTD., Beijing (CN)

(72) Inventors: Xiaoling Zhu, Beijing (CN); Teng Ma, Beijing (CN); Lu Feng, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 967 days.

(21) Appl. No.: 16/231,984

(22) Filed: Dec. 25, 2018

(65) Prior Publication Data

US 2020/0150275 A1 May 14, 2020

Related U.S. Application Data (63) Continuation of application No. PCT/CN2018/115254, filed on Nov. 13, 2018.

(51) Int. Cl.
  *G01S 17/89* (2020.01)
  *G06T 7/80* (2017.01)
  *G06T 7/10* (2017.01)
  *G06V 20/10* (2022.01)

(52) U.S. Cl.
  CPC ............. *G01S 17/89* (2013.01); *G06T 7/10* (2017.01); *G06T 7/80* (2017.01); *G06V 20/10* (2022.01);
  (Continued)

(58) Field of Classification Search
  None
  See application file for complete search history.

(56) References Cited

U.S. PATENT DOCUMENTS

| | | |
|---|---|---|
| 2014/0071234 A1 | 3/2014 | Millett |
| 2015/0254901 A1 | 9/2015 | Pollock et al. |
| 2017/0294026 A1 | 10/2017 | Choi et al. |
| 2019/0156507 A1* | 5/2019 | Zeng ................ G06T 7/11 |

FOREIGN PATENT DOCUMENTS

| | | |
|---|---|---|
| CN | 103390169 A | 11/2013 |
| CN | 104318616 A | 1/2015 |
| | (Continued) | |

OTHER PUBLICATIONS

Supplementary European Search Report issued in corresponding European Application No. EP 18 81 9303, dated Feb. 23, 2021, 7 pages.

(Continued)

*Primary Examiner* — Lindsay J Uhl
(74) *Attorney, Agent, or Firm* — Bayes PLLC (57) ABSTRACT

Embodiments of the disclosure provide methods and systems for generating a color point cloud. The method may include receiving a point cloud and a plurality of images with respect to a scene captured by a plurality of sensors associated with a vehicle as the vehicle moves along a trajectory. The method may include segmenting the point cloud into a plurality of segments each associated with a start point and an end point on the trajectory of the vehicle. The method may also include associating each segment of the point cloud with one or more of the images based on the start point and the end point. The method may further include generating color point cloud by aggregating each segment of the point cloud and the one or more of the images based on calibration parameter in different distances between the segment of the point cloud and the vehicle.

20 Claims, 9 Drawing Sheets

(52) U.S. Cl.
CPC ............... *G06T 2207/10028* (2013.01); *G06T 2207/30241* (2013.01)

(56) References Cited

FOREIGN PATENT DOCUMENTS

| | | | |
|---|---|---|---|
| CN | 104732557 | A | 6/2015 |
| CN | 104794743 | A | 7/2015 |
| CN | 106087621 | A | 11/2016 |
| CN | 107909645 | A | 4/2018 |
| CN | 108629228 | A | 10/2018 |
| CN | 108681525 | A | 10/2018 |
| EP | 3156942 | A | 4/2017 |
| JP | 2015535400 | A | 12/2015 |
| JP | 2017125790 | A | 7/2017 |
| WO | 2013/106920 | A1 | 7/2013 |
| WO | 2013106920 | A1 | 7/2013 |
| WO | 2018/140701 | A2 | 8/2018 |
| WO | 2018140701 | A1 | 8/2018 |
| WO | 2019/210360 | A1 | 11/2019 |
| WO | 2019210360 | A1 | 11/2019 |

OTHER PUBLICATIONS

Hao, Men et al., Color Point Cloud Registration with 4D ICP Algorithm, 2011 IEEE International Conference on Robotics and Automation, 2011, 6 pages.

Cop Konrad P et al., DELIGHT: An Efficient Descriptor for Global Localisation using LiDAR Intensities, 2018 IEEE International Conference on Robotics and Automation (ICRA), 2018, 8 pages.

Notice of Reasons for Rejection issued in corresponding Japanese Application No. 2018-568214, dated Feb. 24, 2021, 2 pages.

First Examination Report issued in corresponding India Application No. 201817049348, dated Jul. 13, 2021, 6 pages.

International Search Report in PCT/CN2018/115254 dated Aug. 12, 2019, 5 pages.

Written Opinion in PCT/CN2018/115254 dated Aug. 12, 2019, 4 pages.

Examination Report No. 3 issued in corresponding Australian Patent Application No. 2018286594, dated Nov. 19, 2020, 7 pages.

Zeng, Fanyang et al., "The algorithm to generate color point point-cloud with the registration between panoramic mage and laser point point-cloud", 35th International Symposium on Remote Sensing of Environment (ISRSE35) Iop Publishing, IOP Conf. Series: Earth and Environmental Science 17 (2014) 012160, doi:10.1088/1755-1315/17/1/012160, 7 pages.

Fengyang Zeng et al., The Algorithm to Generate Color Point-cloud with the Registration Between Panoramic Image and Laser Point-cloud, IOP Conference Series: Earth and Environmental Science, 17, 2014, 7 pages.

Examination Report in Australian Patent Application No. 2018286594 dated Nov. 28, 2019, 9 pages.

The Second Examination Report in Australian Patent Application No. 2018286594 dated Jun. 24, 2020, 7 pages.

* cited by examiner

METHODS AND SYSTEMS FOR COLOR POINT CLOUD GENERATION

CROSS-REFERENCE TO RELATED APPLICATIONS

This application is a Continuation of International Application No. PCT/CN2018/115254, filed on Nov. 13, 2018, the contents of which are incorporated herein by reference.

TECHNICAL FIELD

The present disclosure relates to methods and systems for point cloud generation, and more particularly to, methods and systems for generation of color point cloud using Light Detection And Ranging (LiDAR), camera, and navigation sensors.

BACKGROUND

Autonomous driving technology relies heavily on an accurate map. For example, accuracy of the navigation map is critical to functions of autonomous driving vehicles, such as positioning, ambience recognition, decision making and control. High-definition maps may be obtained by aggregating data acquired by various sensors and detectors on vehicles as they drive around. For example, a typical data acquisition system for high-definition maps is usually a vehicle equipped with multiple integrated sensors such as a LiDAR, a Global Positioning System (GPS) receiver, an Inertial Measurement Unit (IMU) sensor, and one or more cameras, to capture features of the road on which the vehicle is driving and the surrounding objects. Data captured may include, for example, center line or border line coordinates of a lane, coordinates and images of an object, such as a building, another vehicle, a landmark, a pedestrian, or a traffic sign.

LiDAR is known for quickly obtaining three-dimensional (3-D) information of surrounding objects and intensity information of the reflected signals from the surrounding objects. However, LiDAR cannot capture textural information of the surrounding objects and thus, make it difficult to process and interpret the laser point cloud data alone. On the other hand, although cameras can capture images with abundant textural information, they cannot be used directly for obtaining the surrounding objects' 3-D information. Some known systems thus integrate LiDAR and camera to generate color point cloud by aggregating the point cloud and images of the same object, which can be used in visualization, object recognition and classification, 3-D modeling, etc.

In the known systems, panoramic cameras have been widely used for producing color point clouds due to their 360-degree Field of View (FOV). However, panoramic cameras are expensive and therefore not cost-effective for the task. In contrast, monocular cameras are low-cost and images are easy to process, but their FOV is much smaller compared with panoramic cameras. For example, because the FOV of LiDAR is quite large, usually 360 degrees, each laser point cloud captured by a LiDAR can correspond to multiple images taken by a monocular camera. This discrepancy can affect the accuracy and efficiency of aggregating point clouds and images in producing color point clouds.

Embodiments of the disclosure address the above problems by improved methods and systems for color point cloud generation.

SUMMARY

Embodiments of the disclosure provide a method for generating color point cloud. The method may include receiving point cloud and a plurality of images with respect to a scene captured by a plurality of sensors associated with a vehicle as the vehicle moves along a trajectory. The method may include segmenting, by a processor, the point cloud into a plurality of segments each associated with a start point and an end point in the trajectory of the vehicle. The method may also include associating, by the processor, each segment of the point cloud with one or more of the plurality of images based on the start point and the end point. The method may further include generating color point cloud, by the processor, by aggregating each segment of the point cloud and the one or more of the plurality of images based on calibration parameter in different distances between the segment of the point cloud and the vehicle.

Embodiments of the disclosure also provide a system for generating color point cloud. The system may include a communication interface configured to receive point cloud and a plurality of images with respect to a scene captured by a plurality of sensors equipped on a vehicle as the vehicle moves along a trajectory. The system may further include a storage configured to store the point cloud and the plurality of images. The system may also include a processor configured to segment the point cloud into a plurality of segments each associated with a start point and an end point in the trajectory of the vehicle. The processor may be also configured to associate each segment of the point cloud with one or more of the plurality of images based on the start point and the end point. The processor may be further configured to generate color point cloud by aggregating each segment of the point cloud and the one or more of the plurality of images based on calibration parameter in different distances between the segment of the point cloud and the vehicle.

Embodiments of the disclosure further provide a non-transitory computer-readable medium having instructions stored thereon that, when executed by one or more processors, causes the one or more processors to perform operations. The operations may include receiving a point cloud and a plurality of images with respect to a scene captured by a plurality of sensors associated with a vehicle as the vehicle moves along a trajectory. The operations may include segmenting the point cloud into a plurality of segments each associated with a start point and an end point on the trajectory of the vehicle. The operations may also include associating each segment of the point cloud with one or more of the images based on the start point and the end point. The operations may further include generating a color point cloud by aggregating each segment of the point cloud and the one or more of the images based on calibration parameter in different distances between the segment of the point cloud and the vehicle.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
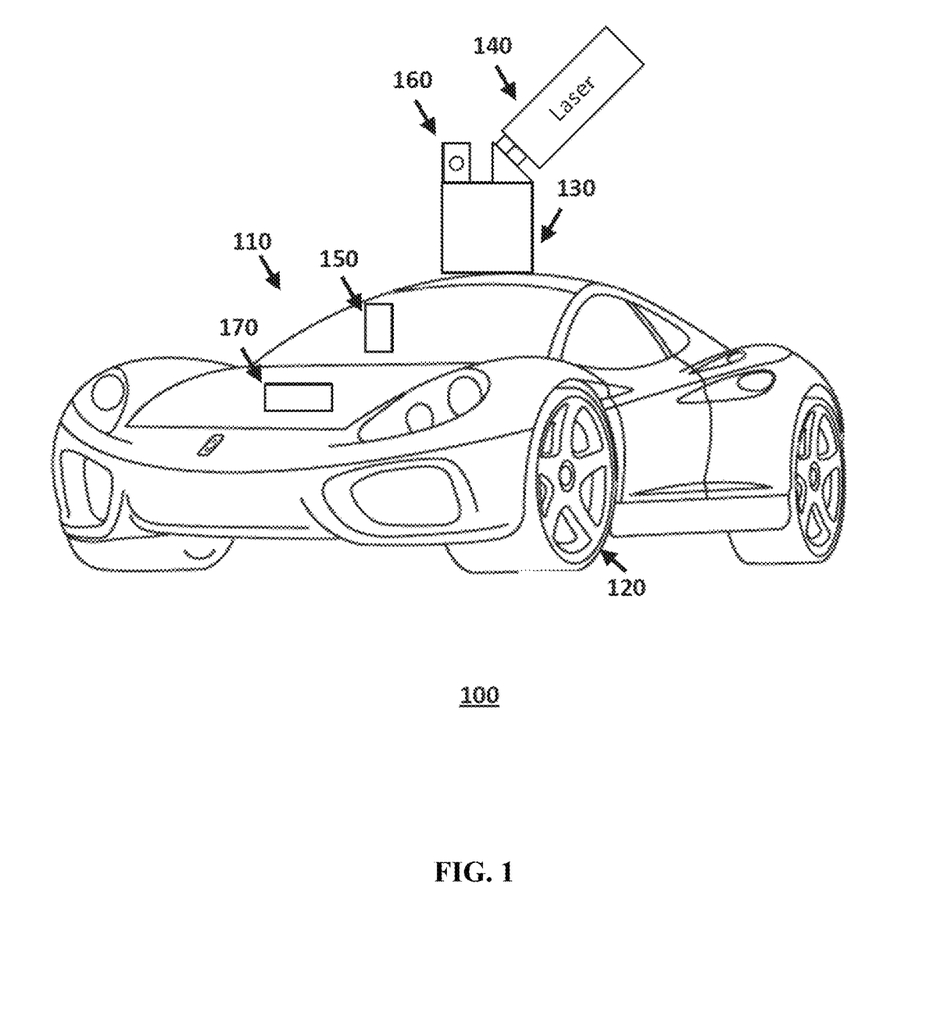
FIG. 1 illustrates a schematic diagram of an exemplary vehicle having sensors, according to embodiments of the disclosure.

FIG. 1 illustrates a schematic diagram of an exemplary vehicle 100 having a plurality of sensors 140, 150, and 160, according to embodiments of the disclosure. Consistent with some embodiments, vehicle 100 may be a survey vehicle configured for acquiring data for constructing a high-definition map or three-dimensional (3-D) city modeling. It is contemplated that vehicle 100 may be an electric vehicle, a fuel cell vehicle, a hybrid vehicle, or a conventional internal combustion engine vehicle. Vehicle 100 may have a body 110 and at least one wheel 120. Body 110 may be any body style, such as a sports vehicle, a coupe, a sedan, a pick-up truck, a station wagon, a sports utility vehicle (SUV), a minivan, or a conversion van. In some embodiments, vehicle 100 may include a pair of front wheels and a pair of rear wheels, as illustrated in FIG. 1. However, it is contemplated that vehicle 100 may have less wheels or equivalent structures that enable vehicle 100 to move around. Vehicle 100 may be configured to be all wheel drive (AWD), front wheel drive (FWR), or rear wheel drive (RWD). In some embodiments, vehicle 100 may be configured to be operated by an operator occupying the vehicle, remotely controlled, and/or autonomous.

As illustrated in FIG. 1, vehicle 100 may be equipped with sensors 140 and 160 mounted to body 110 via a mounting structure 130. Mounting structure 130 may be an electro-mechanical device installed or otherwise attached to body 110 of vehicle 100. In some embodiments, mounting structure 130 may use screws, adhesives, or another mounting mechanism. Vehicle 100 may be additionally equipped with sensor 150 inside or outside body 110 using any suitable mounting mechanisms. It is contemplated that the manners in which each sensor 140, 150, or 160 can be equipped on vehicle 100 are not limited by the example shown in FIG. 1, and may be modified depending on the types of sensors 140-160 and/or vehicle 100 to achieve desirable sensing performance.

Consistent with some embodiments, sensors 140-160 may be configured to capture data as vehicle 100 moves along a trajectory. For example, sensor 140 may be a LiDAR scanner/radar configured to scan the surrounding and acquire point clouds. LiDAR measures distance to a target by illuminating the target with pulsed laser light and measuring the reflected pukes with a sensor. Differences in laser return times and wavelengths can then be used to make digital 3-D representations of the target. The light used for LiDAR scan may be ultraviolet, visible or near infrared Because a narrow laser beam can map physical features with very high resolution, a LiDAR scanner is particularly suitable for high-definition map surveys. In some embodiments, a LiDAR scanner may capture a point cloud. As vehicle 100 moves along the trajectory, sensor 140 may continuously capture data. Each set of scene data captured at a certain time range is known as a data frame.

As illustrated in FIG. 1, vehicle 100 may be additionally equipped with sensor 150, which may include sensors used in a navigation unit, such as a GPS receiver and one or more IMU sensors. A GPS is a global navigation satellite system that provides geolocation and time information to a GPS receiver. An IMU is an electronic device that measures and provides a vehicle's specific force, angular rate, and sometimes the magnetic field surrounding the vehicle, using various inertial sensors, such as accelerometers and gyroscopes, sometimes also magnetometers. By combining the GPS receiver and the IMU sensor, sensor 150 can provide real-time pose information of vehicle 100 as it travels, including the positions and orientations (e.g., Euler angles) of vehicle 100 at each time stamp.

Consistent with the present disclosure, vehicle 100 may be additionally equipped with sensor 160 configured to capture digital images, such as one or more cameras. In some embodiments, sensor 160 may include a panoramic camera with 360-degree FOV or a monocular camera with FOV less than 360 degrees. As vehicle 100 moves along a trajectory, digital images with respect to a scene (e.g., including objects surrounding vehicle 100) can be acquired by sensor 160. Each image may include textual information of the objects in the captured scene represented by pixels. Each pixel may be the smallest single component of a digital image that is associated with color information and coordinates in the image. For example, the color information may be represented by the RGB color model, the CMYK color model, the YCbCr color model, the YUV color model, or any other suitable color model. The coordinates of each pixel may be represented by the rows and columns of the array of pixels in the image. In some embodiments, sensor 160 may include multiple monocular cameras mounted at different locations and/or in different angles on vehicle 100 and thus, have varying view positions and/or angles. As a result, the images may include front view images, side view images, top view images, and bottom view images.

Consistent with the present disclosure, vehicle 100 may include a local controller 170 inside body 110 of vehicle 100 or communicate with a remote controller (not illustrated in FIG. 1) for generating color point clouds based a variety of types of data collected by sensors 140-160 in an efficiency and effective manner. In some embodiments, to increase the processing speed, point cloud may be segmented into segments, each of which can be aggregated separately (for example in parallel) with corresponding images. The images from sensor 160 can be captured by one or more monocular cameras with various views of the same scene and merged together to be matched to the scene's 3-D point cloud captured by sensor 140 with a 360-degree FOV, such as a LiDAR scanner. In some embodiments, to improve the accuracy of the color point cloud, the correlation between distances and calibration parameters (e.g., rotation matrices and translation vectors) may be taken into account in aggregating the point cloud and corresponding images. A series of calibration parameters corresponding to different distances between the points and the sensor may be determined first, and the suitable calibration parameters can be selected later for processing points with corresponding distances.

In some embodiments, to further reduce aggregation latency, not all the images need to be aggregated with a corresponding point cloud segment. For example, a point cloud segment may be aggregated with every m matching images, where m may be determined based on various factors, such as the moving speed of vehicle 100 along the trajectory, the image sampling rate, etc. In another example, the front view image of the scene may be aggregated with the point cloud segment first, and images with other views may be used for aggregation if there are any points that cannot be covered by the front view image. In still another example, because the further a point is from vehicle 100, the larger the error may be when the point is matched to an image, an effective distance may be predetermined as the threshold to remove points that are too far away from vehicle 100 from the point cloud.

Figure 2:
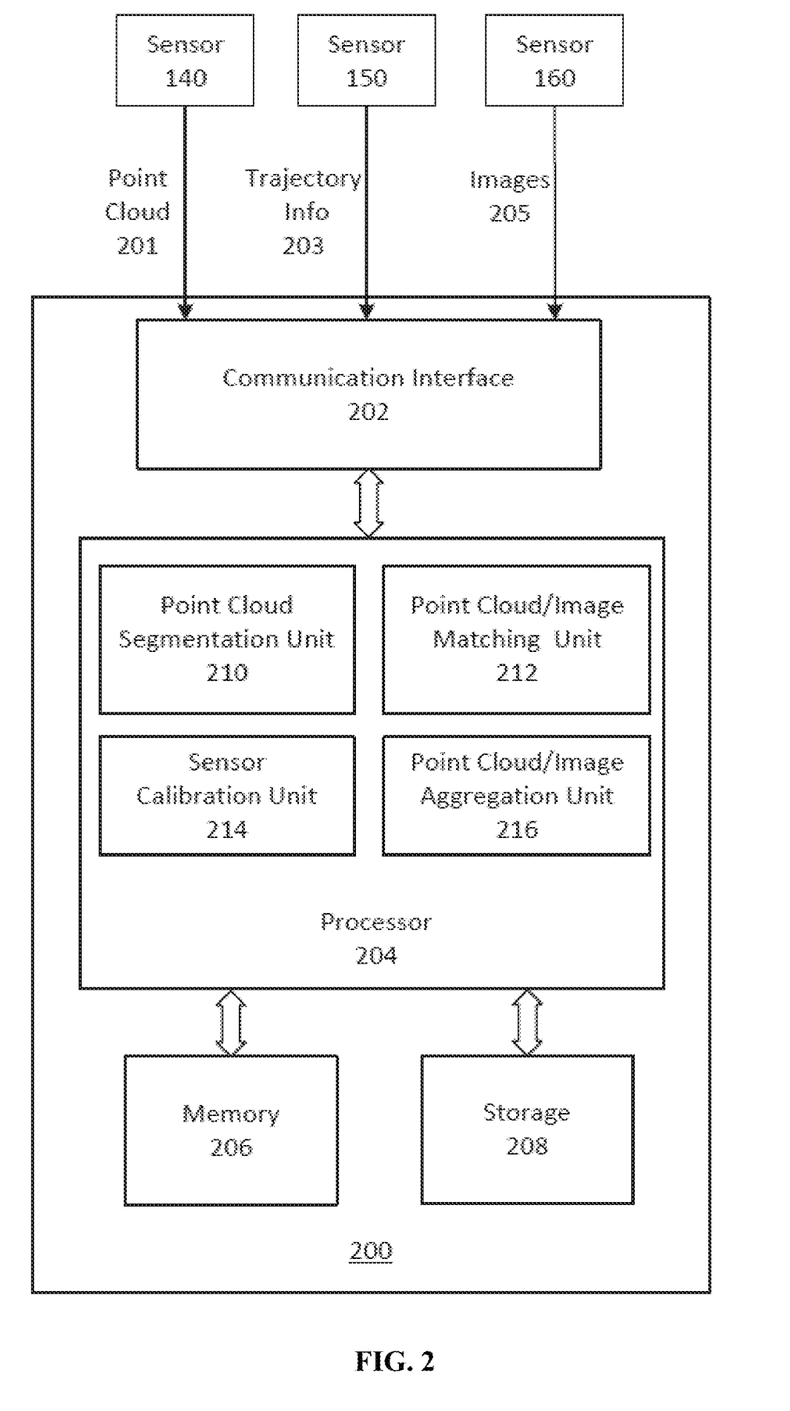
FIG. 2 illustrates a block diagram of an exemplary controller for color point cloud generation, according to embodiments of the disclosure.

For example, FIG. 2 illustrates a block diagram of an exemplary controller 200 for generating a point cloud, according to embodiments of the disclosure. Consistent with the present disclosure, controller 200 may use various types of data for generating color point cloud of a scene. The various types of data may be captured by sensors 140-160 equipped on vehicle 100 with respect to the scene, as vehicle 100 moves along a trajectory. The data may include point cloud 201 captured by sensor 140 (e.g., a LiDAR scanner), trajectory information 203 of vehicle 100 acquired by sensor 150 (e.g., a GPS receiver and/or one or more IMU sensors), and a plurality of images 205 captured by sensor 160 (e.g., one or more monocular cameras). In some embodiments, point cloud 201 may be obtained by transforming the native data from the LiDAR scanner in a local coordinate system into a global coordinate system (e.g., the longitude/latitude coordinates) based on the real-time pose information (e.g., positions and orientations) from the GPS receiver and IMU sensors.

In some embodiments, as shown in FIG. 2, controller 200 may include a communication interface 202, a processor 204, a memory 206, and a storage 208. In some embodiments, controller 200 may have different modules in a single device, such as an integrated circuit (IC) chip (implemented as an application-specific integrated circuit (ASIC) or a field-programmable gate array (FPGA), or separate devices with dedicated functions. In some embodiments, one or more components of controller 200 may be located inside vehicle 100 (e.g., local controller 170 in FIG. 1) or may be alternatively in a mobile device, in the cloud, or another remote location. Components of controller 200 may be in an integrated device, or distributed at different locations but communicate with each other through a network (not shown). For example, processor 204 may be a processor on-board vehicle 100, a processor inside a mobile device, or a cloud processor, or any combinations thereof.

Communication interface 202 may send data to and receive data from components such as sensors 140-160 via communication cables, a Wireless Local Area Network (WLAN), a Wide Area Network (WAN), wireless networks such as radio waves, a nationwide cellular network, and/or a local wireless network (e.g., Bluetooth™ or WiFi), or other communication methods. In some embodiments, communication interface 202 can be an integrated services digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a network.

Consistent with some embodiments, communication interface 202 may receive data captured by sensors 140-160, including point cloud 201, trajectory information 203, and images 205, and provide the received data to storage 208 for storage or to processor 204 for processing. Communication interface 202 may also receive a color point cloud generated by processor 204, and provide the color point cloud to any local component in vehicle 100 or any remote device via a network.

Processor 204 may include any appropriate type of general-purpose or special-purpose microprocessor, digital signal processor, or microcontroller. Processor 204 may be configured as a separate processor module dedicated to generating color point clouds. Alternatively, processor 204 may be configured as a shared processor module for performing other functions unrelated to color point cloud generation.

As shown in FIG. 2, processor 204 may include multiple modules, such as a point cloud segmentation unit 210, a point cloud/image matching unit 212, a sensor calibration unit 214, a point cloud/image aggregation unit 216, and the like. These modules (and any corresponding sub-modules or sub-units) can be hardware units (e.g., portions of an integrated circuit) of processor 204 designed for use with other components or to execute a part of a program. The program may be stored on a computer-readable medium, and when executed by processor 204, it may perform one or more functions. Although FIG. 2 shows units 210-216 all within one processor 204, it is contemplated that these units may be distributed among multiple processors located near or remotely with each other.

Point cloud segmentation unit 210 may be configured to segment point cloud 201 into multiple point cloud segments based on trajectory information 203 in order to reduce the computation complexity and increase processing speed. Each point cloud segment may be associated with a start point and an end point on the trajectory of vehicle 100. Trajectory information 203 may be acquired by sensor 150, such as a GPS receiver and one or more IMU sensors, and include the real-time pose information of vehicle 100 as vehicle 100 moves along the trajectory. For example, the real-time pose information may include the position and orientation of vehicle 100 at each time stamp.

Figure 3:
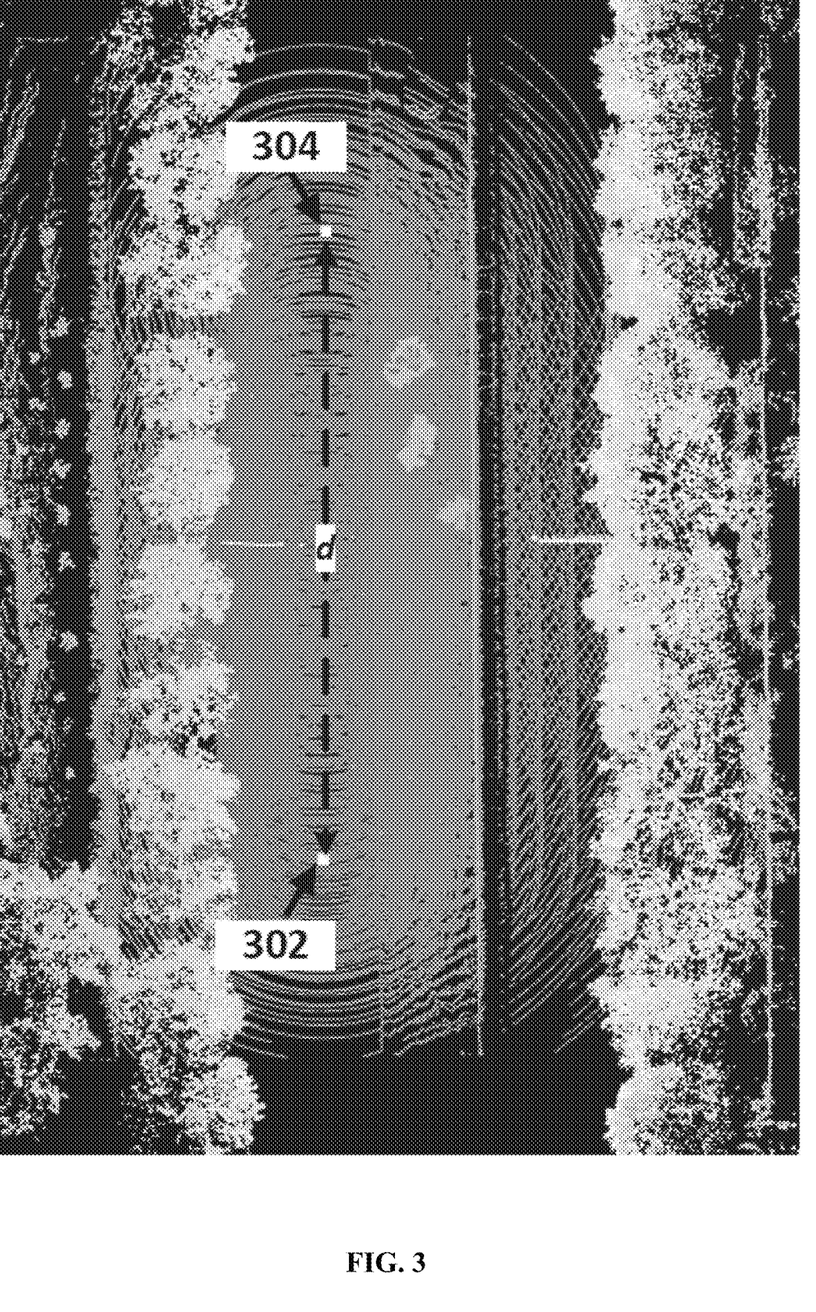
FIG. 3 illustrates an exemplary point cloud segment and its associated start and end points on a vehicle trajectory, according to embodiments of the disclosure.

In some embodiments, each point cloud segment may be associated with a segment of the trajectory between a start point and an end point. Each segment of the trajectory may correspond to a same predetermined moving distance of vehicle 100. For example, a moving distance d may be predetermined and set in point cloud segmentation unit 210. Assuming the departure time of vehicle 100 is $t_0$, according to the trajectory of vehicle 100, point cloud segmentation unit 210 may record the moving distance of vehicle 100 until it reaches d at time $t_1$. The segment of point cloud 201 corresponding to the segment of trajectory traveled by vehicle 100 within time interval $t_0$-$t_1$ is set to be associated with the moving distance d. Point cloud segmentation unit 210 may also record the start point (at time $t_0$) and the end point (at time $t_1$) on the trajectory and associate the start and end points with the point cloud segment. In this manner, point cloud segmentation unit 210 may divide point cloud 201 into n segments, each of which is associated with the predetermined moving distance d. For example, FIG. 3 illustrates an exemplary point cloud segment and its associated start and end points on a vehicle trajectory, according to embodiments of the disclosure. As shown in FIG. 3, a point cloud segment is associated with a start point 302 and an end point 304 in the trajectory of vehicle 100, and the moving distance between start and end points 302 and 304 is the predetermined value d.

Returning to FIG. 2, point cloud/image matching unit 212 may be configured to associate each point cloud segment with one or more images of images 205 based on the start point and the end point associated with the point cloud segment. For each point cloud segment, there may be more than one corresponding image (i.e., an image sequence), each covering at least some points in the point cloud segment. Point cloud/image matching unit 212 may match each point cloud segment with the corresponding image sequence using the start and end points associated with the point cloud segment as reference points. Because the FOV of the monocular camera(s) used for taking images 205 may be smaller than the FOV of the LiDAR scanner used for capturing point cloud 201, the positions of the matching image sequence may be ahead of the start and end points of the point cloud segment.

In some embodiments, point cloud/image matching unit 212 may determine a first image $image_s$ of images 205 based on the start point $P_s$ associated with the point cloud segment and a first threshold $d_1$. The first distance between the start point $P_s$ and a first base point $BP_s$ (the position at which sensor 160 captured the first image $image_s$) on the trajectory of vehicle 100 where the first image $image_s$ is captured may equal the first threshold $d_1$. Point cloud/image matching unit 212 may also determine a second image $image_e$ of images 205 based on the end point $P_e$ associated with the point cloud segment and a second threshold $d_2$. The second distance between the end point $P_e$ and a second base point $BP_e$ (the position at which sensor 160 captured the second image $image_s$) on the trajectory of vehicle 100 where the second image $image_e$ is captured may equal the second threshold $d_2$. Point cloud/image matching unit 212 then may determine the matching image sequence $\{image_s, \ldots, image_e\}$ as images captured between the first base point $BP_s$ and the second base point $BP_e$ on the trajectory of vehicle 100. The first base point $BP_s$ may be ahead of the start point $P_s$ on the trajectory, and the second base point $BP_e$ may be ahead of the end point $P_e$ on the trajectory.

Figure 4:
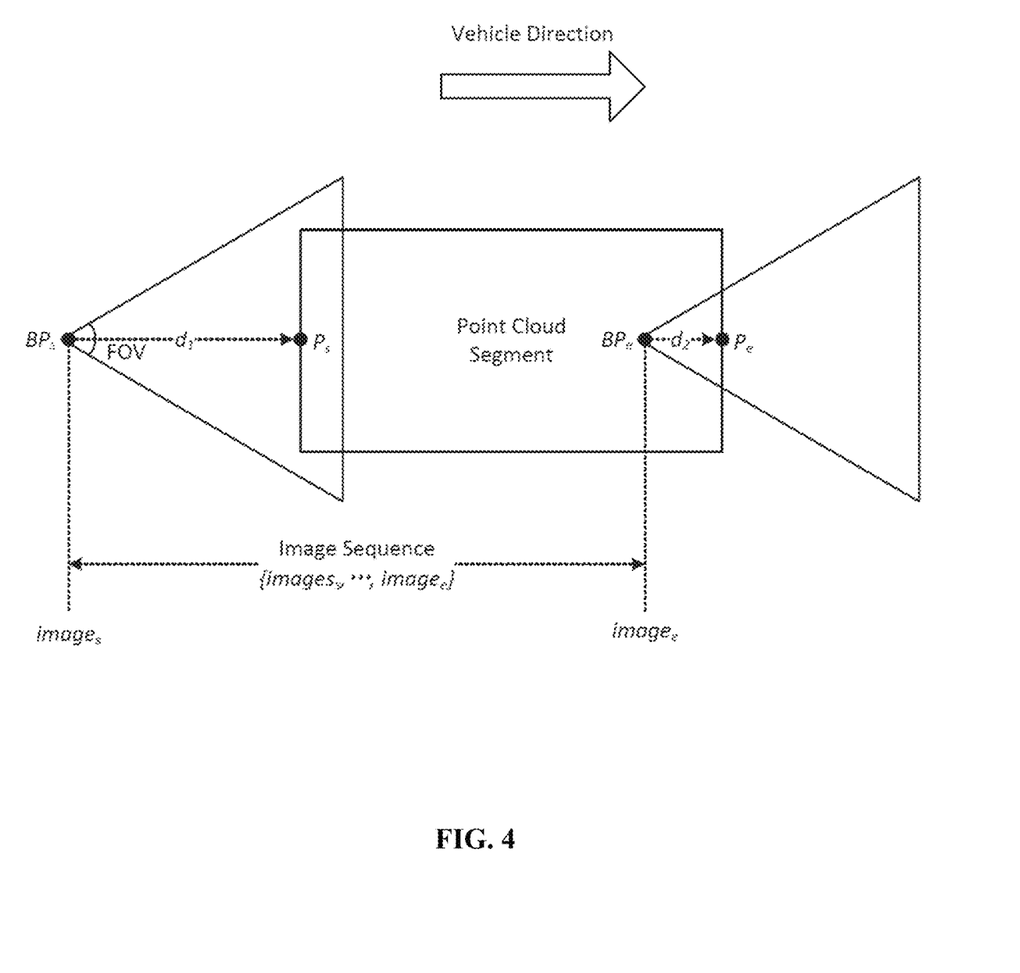
FIG. 4 illustrates an exemplary process of matching a point cloud segment and an image sequence, according to embodiments of the disclosure.

For example, FIG. 4 illustrates an exemplary process of matching a point cloud segment and an image sequence, according to embodiments of the disclosure. The first and second thresholds $d_1$ and $d_2$ may be predetermined based on any suitable factors, such as the FOV of the monocular cameras, the dimensions and resolution of the images, the dimensions and resolution of the point cloud segment, etc. In some embodiments, the first and second thresholds $d_1$ and $d_2$ may be different. For example, the first threshold $d_1$ may be larger than the second threshold $d_2$ as shown in FIG. 4. The matching image sequence $\{image_s, \ldots, image_e\}$ starts with the first image $image_s$ and ends with the second image $image_e$. For the first image $image_s$, the distance between the first base point $BP_s$ and the start point $P_s$ of the point cloud segment is the same as the first threshold $d_1$. Similarly, for the second image $image_e$, the distance between the second base point $BP_e$ and the end point $P_e$ of the point cloud segment is the same as the second threshold $d_2$. It is contemplated that the matching image sequence does not necessarily include all the images in images 205 that can cover at least some points of the point cloud segment. As shown in FIG. 4, by setting the first and second thresholds $d_1$ and $d_2$, some images that are before the first image $image_s$ or after the second image $image_e$ may not be included in the matching image sequence $\{image_s, \ldots, image_e\}$ because the matching image sequence $\{image_s, \ldots, image_e\}$ already can provide sufficient textural information for generating the color point cloud.

Returning to FIG. 2, sensor calibration unit 214 may be configured to determine one or more calibration parameters associated with each point cloud segment based on calibration parameter in different distances between the point cloud segment and vehicle 100. Sensor calibration, including calibration of the integrated LiDAR scanner and camera(s), is necessary for obtaining the projection relationship between point clouds and images. The accuracy of sensor calibration may be affected by the distance between the target (e.g., objects surrounding vehicle 100 in the captured scene) and the sensors (e.g., sensors 140-160 equipped on vehicle 100). The smaller the distance is, the more accurate the calibration may be. Accordingly, sensor calibration unit 214 may increase the sensor calibration accuracy by determining several sets of the calibration parameters based on the distance between the point cloud segment (representing 3-D information of the surrounding objects in the scene) and vehicle 100 (on which sensors 140-160 are equipped). Sensor calibration unit 214 may select feature point(s) from the point cloud segment and identify corresponding pixels in the matching image based on their coordinates. Sensor calibration unit 214 may calculate one or more calibration parameters of the point cloud segment and the matching image, such as rotation matrices and translation vectors, based on the 3-D to 2-D transformation relationship of the feature point(s). To increase the calibration accuracy, sensor calibration unit 214 may provide different calibration parameters based on the varying distances between the point cloud segment and vehicle 100.

Figure 5:
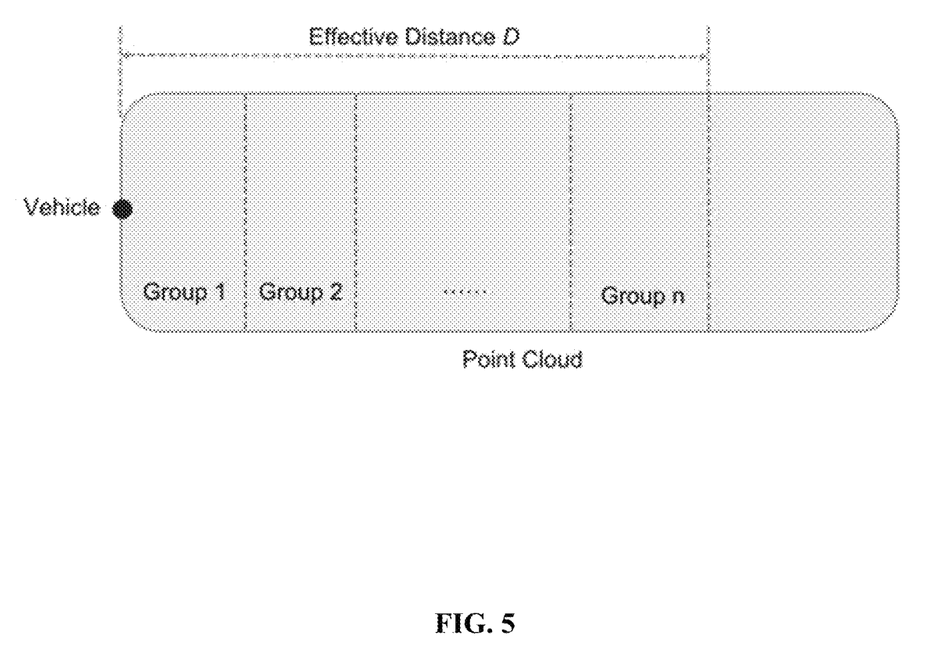
FIG. 5 illustrates an exemplary process of sensor calibration, according to embodiments of the disclosure.

In some embodiments, sensor calibration unit 214 may be configured to divide point cloud 201 into groups based on different distances (within effective distance D) between the point and the vehicle and determine calibration parameters for each group of point cloud 201 based on at least three pairs of feature points in the point cloud group and corresponding matching images as described above. A point cloud may include one or more point cloud groups. Sensor calibration unit 214 may be further configured to assign the calibration parameters to each point cloud segment in the corresponding point cloud group. FIG. 5 illustrates an exemplary process of sensor calibration, according to embodiments of the disclosure. Based on the LiDAR scanner's measurement range relative to the vehicle (effective distance D), point cloud 201 may be divided into n groups with different measurement distances. For each of the n groups, at least three pairs of feature points may be selected for sensor calibration with matching images to obtain n sets of calibration parameters $\{param_1, \ldots, param_n\}$. Each set of calibration parameters can be used to calibrate a corresponding pair of camera and LiDAR scanner at a certain distance.

Returning to FIG. 2, point cloud/image aggregation unit 216 may be configured to aggregate each point cloud segment and the matching images based on the respective distance between the point cloud segment and vehicle 100 to generate color point cloud. Point cloud/image aggregation unit 216 may identify the suitable calibration parameters for each point cloud segment based on the point cloud group to which the point cloud segment belongs. That is, different point cloud segments may be aggregated with the matching images using different calibration parameters depending on their measurement distances. When the points in the point cloud segment are projected to the matching images, the further the distance between the point and vehicle 100 is, the larger the error may be. Thus, in some embodiments, an effective distance D may be predetermined to allow only points within D to be colored by the corresponding pixels in the images. Point cloud/image aggregation unit 216 may be configured to match corresponding pixels in the images with each point that is within the effective distance D, for example, based on their coordinates using the calibration parameters. Point cloud/image aggregation unit 216 may be further configured to assign the color information (e.g., the RGB values in the RGB color model) associated with each pixel to the corresponding point to color the point cloud.

In some embodiments, to reduce the computation complexity and increase the processing speed, point cloud/image aggregation unit 216 may be configured to select every m images from the matching images and aggregate the point cloud segment with the selected images, as opposed to all the matching images. The value m for selecting the matching images may be determined based on various factors, such as the moving speed of vehicle 100 and/or the sampling rate of images 205. As described above, for each point within the effective distance D, the corresponding pixel in the selected images may be identified based on the calibration parameters specific to the point cloud segment by point cloud/image aggregation unit 216. Point cloud/image aggregation unit 216 may then assign the color information of the identified pixels to each point (within the effective distance D) to generate a color point cloud segment.

Figure 6:
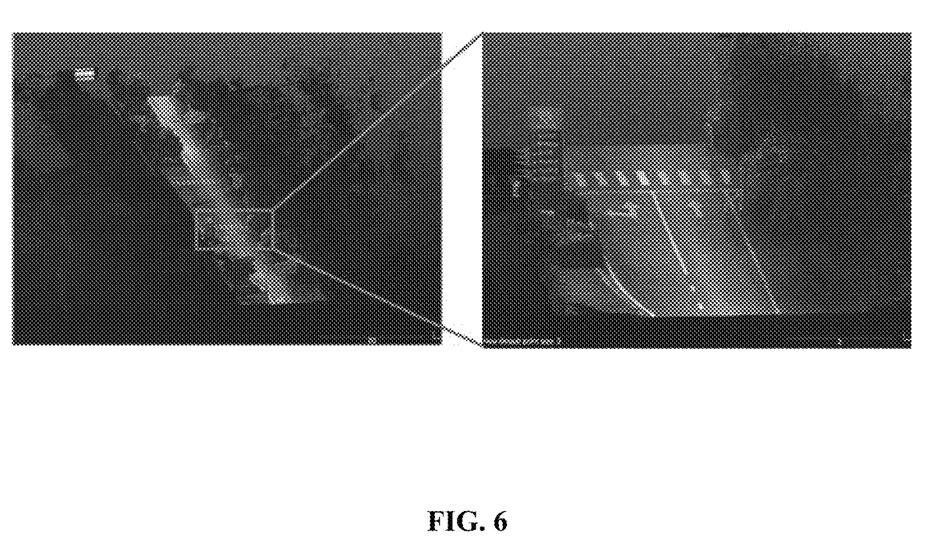
FIG. 6 illustrates exemplary generated color point clouds, according to embodiments of the disclosure.

In some embodiments, when the matching images include images with varying views, such as front view, side view, top view, or bottom view, captured by multiple monocular cameras, point cloud/image aggregation unit 216 may be further configured to aggregate the point cloud segment with the front view image first. If the front view image cannot cover all the points in the point cloud segment, point cloud/image aggregation unit 216 then may use other matching images with other views (e.g., side view, top view, or bottom view images) to color all the remaining points in the point cloud segment. Point cloud/image aggregation unit 216 may perform the same aggregation process as described above for all the point cloud segments to generate color point cloud. The color point cloud thus may include both the 3-D information and textural information for each point. For example, FIG. 6 illustrates exemplary generated color point clouds, according to embodiments of the disclosure. An image 610 illustrates color point cloud of a scene including a road and surrounding objects, such as plants. An image 620 illustrates an expanded part of the color point cloud in image 610. Both 3-D information and textural information (e.g., color) can be obtained from the color point cloud of the captured scene in images 610 and 620.

Referring back to FIG. 2, memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform color point cloud generation functions disclosed herein. For example, memory 206 and/or storage 208 may be configured to store program(s) that may be executed by processor 204 to control sensors 140-160 to capture various types of data when vehicle 100 moves along a trajectory, and process the captured data to generate a color point cloud.

Memory 206 and/or storage 208 may be further configured to store information and data used by processor 204. For instance, memory 206 and/or storage 208 may be configured to store the various types of data captured by sensors 140-160 and the generated color point clouds. The various types of data may be stored permanently, removed periodically, or disregarded immediately after each frame of data is processed.

Figure 7:
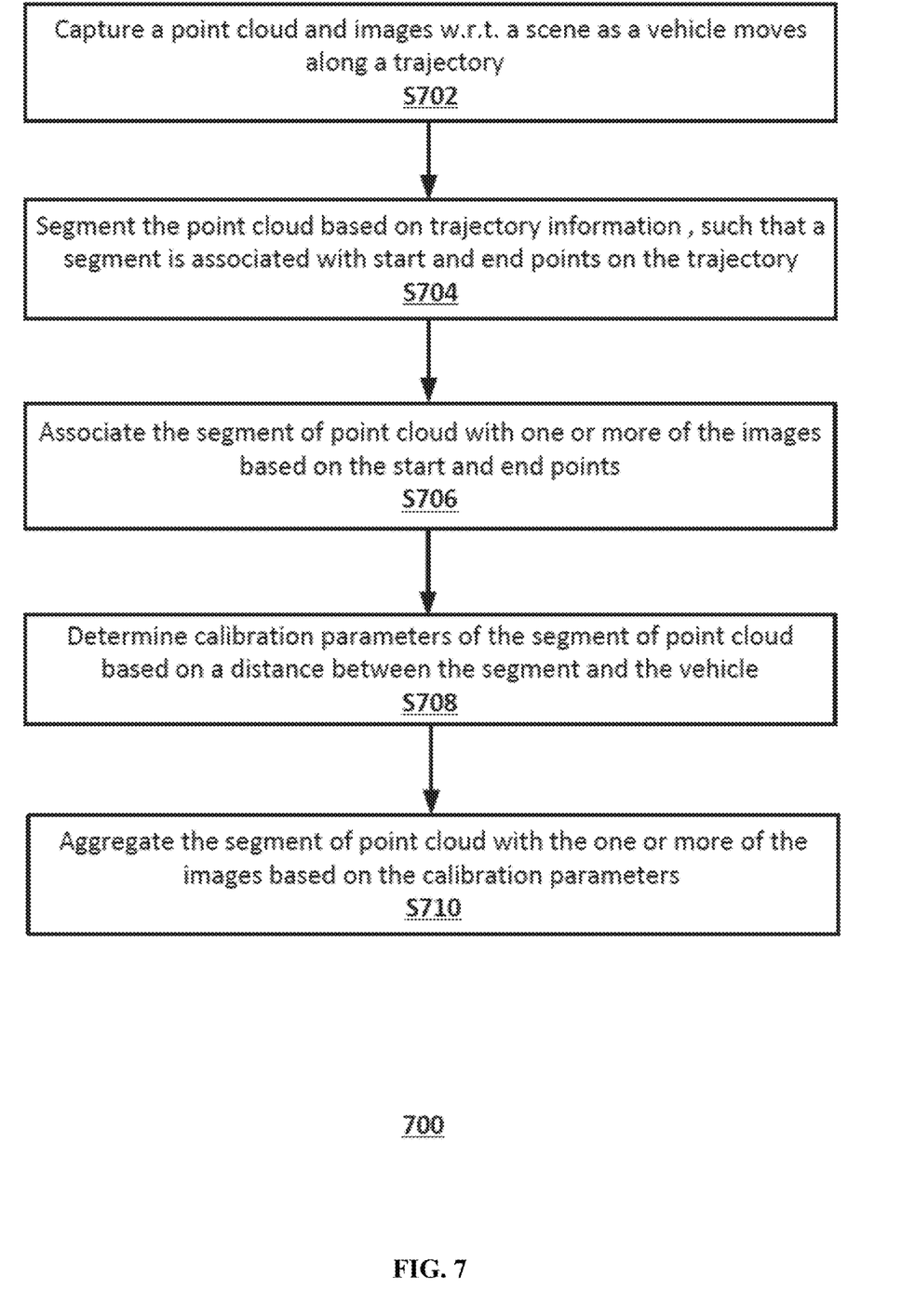
FIG. 7 illustrates a flowchart of an exemplary method for generating a color point cloud, according to embodiments of the disclosure.

FIG. 7 illustrates a flowchart of an exemplary method 700 for generating color point cloud, according to embodiments of the disclosure. For example, method 700 may be implemented by a color point cloud generation system of vehicle 100 that includes, among other things, controller 200 and sensors 140-160. However, method 700 is not limited to that exemplary embodiment. Method 700 may include steps S702-S710 as described below. It is to be appreciated that some of the steps may be optional to perform the disclosure provided herein. Further, some of the steps may be performed simultaneously, or in a different order than shown in FIG. 7.

In step S702, a point cloud and a plurality of images with respect to a scene may be captured by sensors 140-160 associated with vehicle 100, as vehicle 100 moves along a trajectory. For example, a LiDAR scanner equipped on vehicle 100 may capture the point cloud representing the 3-D information of the scene, and one or more monocular cameras equipped on vehicle 100 may capture the images representing the textural information of the scene. In some embodiments, a GPS receiver and one or more IMU sensors equipped on vehicle 100 may acquire trajectory information of vehicle 100, including time, positions, and orientations.

In step S704, the point cloud may be segmented, by processor 204, into a plurality of point cloud segments based on the trajectory information, such that a point cloud segment is associated with a start point and an end point on the trajectory of vehicle 100. Each point cloud segment may be associated with the same predetermined moving distance of vehicle 100 on the trajectory corresponding to the start and end points.

In step S706, the point cloud segment may be associated, by processor 204, with one or more of the images based on the start and end points on the trajectory of vehicle 100. In some embodiments, a first image may be determined based on the start point associated with the point cloud segment and a first threshold. The first threshold is set as the first distance between the start point and a first base point where the first image is captured by sensor 160. A second image may be determined based on the end point associated with the point cloud segment and a second threshold. The second threshold is set as the second distance between the end point and a second base point where the second image is captured by sensor 160. The first base point may be ahead of the start point on the trajectory, and the second base point may be ahead of the end point on the trajectory. The first and second thresholds may be predetermined based on any suitable factors, such as the FOV of the monocular cameras, the dimensions and resolution of the images, the dimensions and resolution of the point cloud segment, etc. The one or more of the images may include images captured between the first base point and the second base point on the trajectory of vehicle 100.

Figure 8:
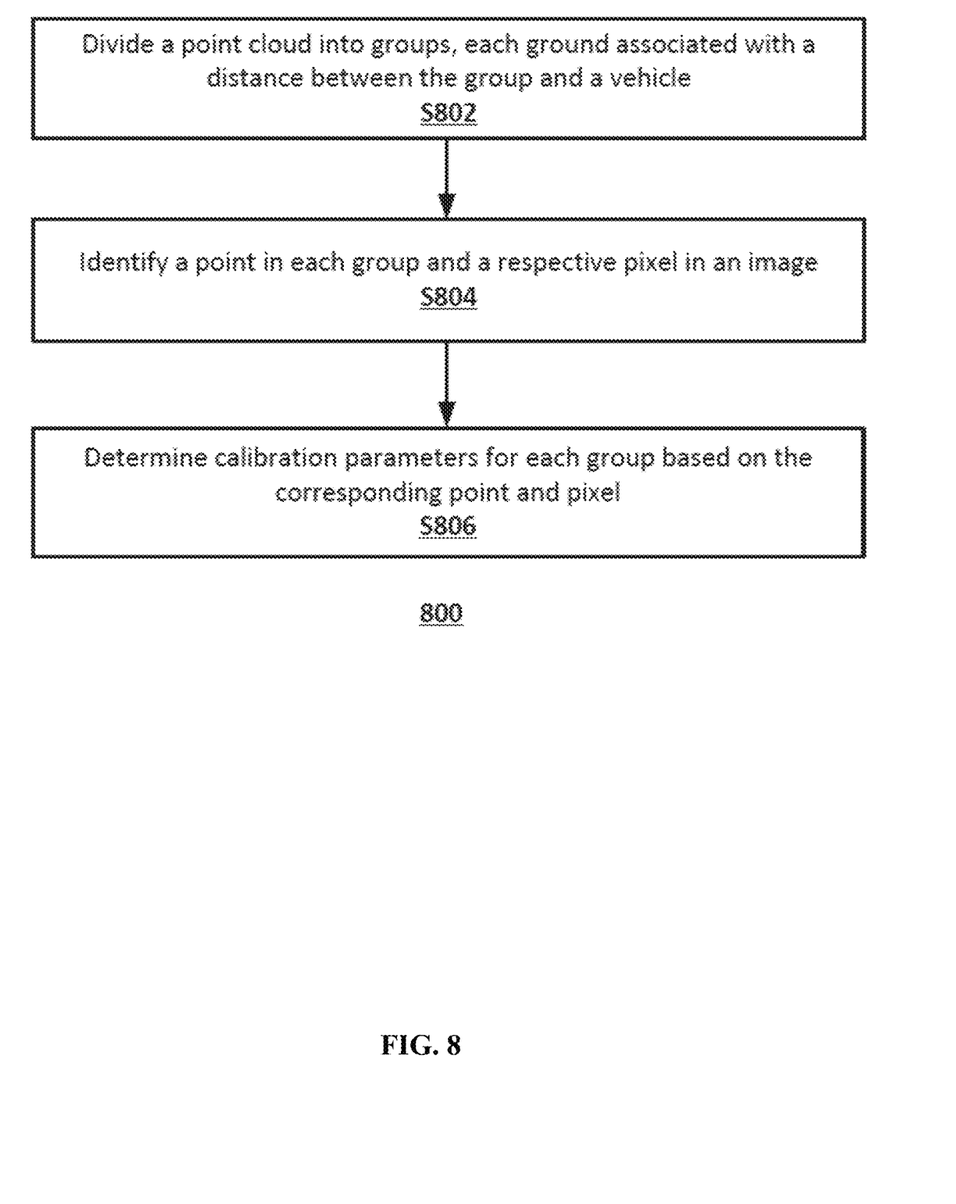
FIG. 8 illustrates a flowchart of an exemplary method for determining calibration parameters, according to embodiments of the disclosure.

In step S708, one or more calibration parameters of the point cloud segment may be determined, by processor 204, based on calibration parameter in different distances between the point cloud segment and vehicle 100. The calibration parameters include, for example, rotation matrices and translation vectors for transforming feature points in the point cloud to the corresponding pixels in the associated images. For example, FIG. 8 illustrates a flowchart of an exemplary method 800 for determining calibration parameters, according to embodiments of the disclosure. In step S802, the point cloud may be divided into a plurality of groups. Each point cloud group may include one or more point cloud segments and may be associated with a distance between the point cloud group and vehicle 100. In step S804, a point in each point cloud group and a respective pixel in an image may be identified based on, for example, the coordinates of the point and the pixel. In step S806, one or more calibration parameters for each point cloud group may be determined based on the corresponding point and pixel. In some embodiments, the measurement distances of the LiDAR scanner may be used as the basis for dividing the point cloud into groups, and feature points in each point cloud group and the corresponding pixels in the associated images may be used for calculating the calibration parameters (e.g., rotation matrices and translation vectors) specific to the point cloud group.

Figure 9:
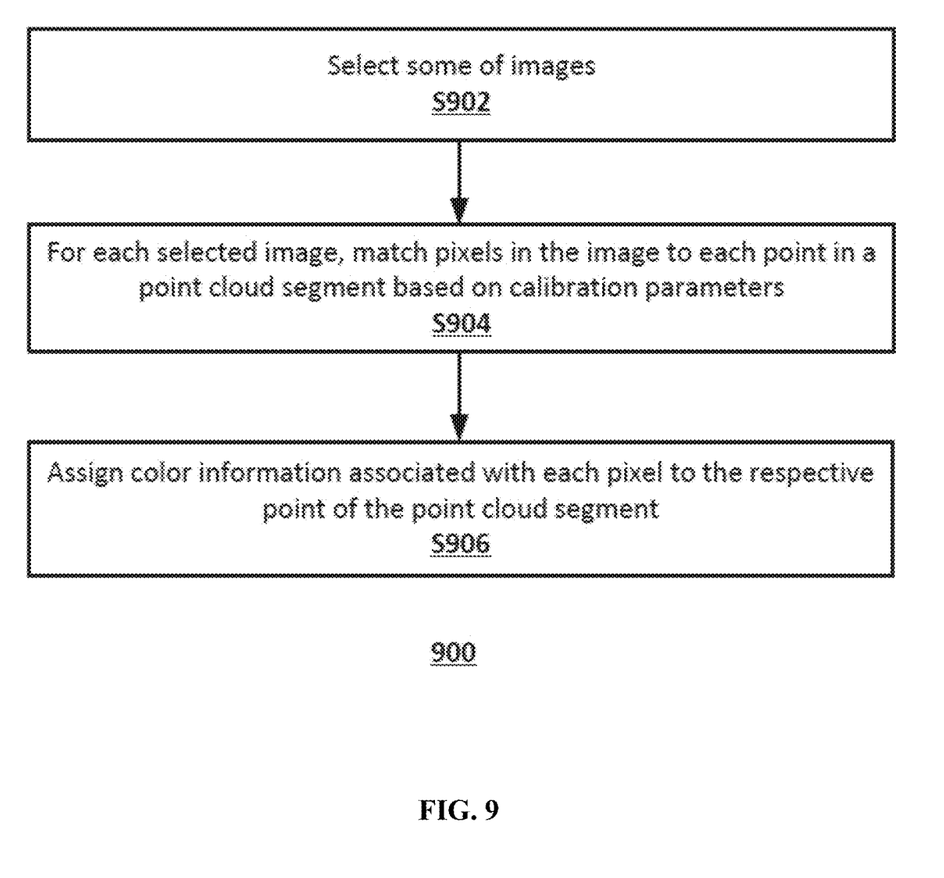
FIG. 9 illustrates a flowchart of an exemplary method for aggregating a point cloud segment and a plurality of images, according to embodiments of the disclosure.

Returning to FIG. 7, in step S710, each point cloud segment may be aggregated, by processor 204, with the associated one or more images based on the respective calibration parameters to generate a color point cloud. The calibration parameters may be determined based on the distance between the point cloud segment and vehicle 100 as described above with respect to FIG. 8. For example, FIG. 9 illustrates a flowchart of an exemplary method 900 for aggregating a point cloud segment and a plurality of images, according to embodiments of the disclosure. In step S902, some of the associated images may be selected. In some embodiments, m image may be selected out of the associated images, where m may be determined based on the moving speed of vehicle 100 along the trajectory and/or the sampling rate the images. In step S904, for each of the selected images, pixels in the image may be matched to each point in the point cloud segment based on the calibration parameters. In some embodiments, the points may be within a predetermined effective distance from vehicle 100. In some embodiments, if the selected images include a front view image, then the front view image may have a higher priority than images with other views to be processed. In step S906, color information associated with each pixel may be assigned to the respective point in the point cloud segment to color the point cloud segment. In some embodiments where RGB model is used, the color information may include the RGB values of the pixel according to the RGB color model.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A method for generating color point cloud, implemented on a computing device having a processor, at least one non-transitory computer-readable storage medium, and a communication platform connected to a network, the method comprising:
  receiving a point cloud and a plurality of images with respect to a scene captured by a plurality of sensors associated with a vehicle as the vehicle moves along a trajectory;
  segmenting, by the processor, the point cloud into a plurality of segments each associated with a start point and an end point on the trajectory of the vehicle;
  associating, by the processor, each segment of the point cloud with one or more of the plurality of images based on the start point and the end point; and
  generate color point cloud, by the processor, by aggregating each segment of the point cloud and the one or more of the plurality of images based on calibration parameter in different distances between the segment of the point cloud and the vehicle.

2. The method of claim 1, wherein each segment of the point cloud is associated with a same moving distance of the vehicle on the trajectory between the start point and the end point.

3. The method of claim 1, wherein segmenting the point cloud is based on time, position, and orientation of the vehicle on the trajectory.

4. The method of claim 1, wherein:
  associating the segment of the point cloud with the one or more of the plurality of images comprises:
    determining a first image of the plurality of images based on the start point and a first threshold, wherein a first distance between the start point and a first base point where the first image is captured equals the first threshold, and
    determining a second image of the plurality of images based on the end point and a second threshold, wherein a second distance between the end point and a second base point where the second image is captured equals the second threshold; and
  the one or more of the plurality of images include images captured between the first base point and the second base point on the trajectory.

5. The method of claim 4, wherein the first base point is ahead of the start point on the trajectory, and the second base point is ahead of the end point on the trajectory.

6. The method of claim 1, further comprising:
  determining a plurality sets of calibration parameters associated with each segment of the point cloud based on the distances between the segment of the point cloud and the vehicle; and
  aggregating the segment of the point cloud and the one or more of the plurality of images based on the calibration parameter.

7. The method of claim 6, wherein determining a plurality of sets of calibration parameters associated with the segment of the point cloud comprises:

dividing the point cloud into a plurality of groups, each group of the point cloud associated with a distance between the respective group of the point cloud and the vehicle;

determining calibration parameters for each group of the point cloud based on a point in the group of the point cloud; and assigning, to the segment of the point cloud, the calibration parameter for the group of the point cloud to which the segment of the point cloud belongs.

8. The method of claim 6, wherein aggregating the segment of the point cloud and the one or more of the plurality of images comprises:

selecting some of the one or more of the plurality of images;

for each of the selected images, matching a plurality of pixels in the image to each point in the segment of the point cloud based on the calibration parameter; and assigning color information associated with each of the plurality of pixels to the respective point in the segment of the point cloud.

9. The method of claim 1, wherein the one or more of the plurality of images include a front view image of the scene.

10. A system for generating color point cloud, comprising:

a communication interface configured to receive a point cloud and a plurality of images with respect to a scene captured by a plurality of sensors equipped on a vehicle as the vehicle moves along a trajectory;

a storage configured to store the point cloud and the plurality of images; and a processor configured to:

segment the point cloud into a plurality of segments each associated with a start point and an end point on the trajectory of the vehicle;

associate each segment of the point cloud with one or more of the plurality of images based on the start point and the end point; and generate color point cloud by aggregating each segment of the point cloud and the one or more of the plurality of images based on calibration parameter in different distances between the segment of the point cloud and the vehicle.

11. The system of claim 10, wherein each segment of the point cloud is associated with a same moving distance of the vehicle on the trajectory between the start point and the end point.

12. The system of claim 10, wherein segmenting the point cloud is based on time, position, and orientation of the vehicle on the trajectory.

13. The system of claim 10, wherein:

to associate the segment of the point cloud with the one or more of the plurality of images, the processor is configured to:

determine a first image of the plurality of images based on the start point and a first threshold, wherein a first distance between the start point and a first base point where the first image is captured equals the first threshold, and determine a second image of the plurality of images based on the end point and a second threshold, wherein a second distance between the end point and a second base point where the second image is captured equals the second threshold; and the one or more of the plurality of images include images captured between the first base point and the second base point on the trajectory.

14. The system of claim 13, wherein the first base point is ahead of the start point on the trajectory, and the second base point is ahead of the end point on the trajectory.

15. The system of claim 10, wherein the processor is further configured to:

determine a plurality of sets of calibration parameters associated with each segment of the point cloud based on the distance between the segment of the point cloud and the vehicle; and aggregate the segment of the point cloud and the one or more of the plurality of images based on the calibration parameter.

16. The system of claim 15, wherein to determine the plurality of sets of calibration parameters associated with the segment of the point cloud, the processor is configured to:

divide the point cloud into a plurality of groups, each group of the point cloud associated with a distance between the respective group of the point cloud and the vehicle;

determine calibration parameters for each group of the point cloud based on a point in the group of the point cloud; and assign, to the segment of the point cloud, the calibration parameter for the group of the point cloud to which the segment of the point cloud belongs.

17. The system of claim 15, wherein to aggregate the segment of the point cloud and the one or more of the plurality of images, the processor is configured to:

select some of the one or more of the plurality of images;

for each of the selected images, match a plurality of pixels in the image to each point in the segment of the point cloud based on the calibration parameter; and assign color information associated with each of the plurality of pixels to the respective point in the segment of the point cloud.

18. The system of claim 10, wherein the one or more of the plurality of images include a front view image of the scene.

19. The system of claim 10, wherein the plurality of sensors include a Light Detection And Ranging (LiDAR) laser scanner and one or more monocular cameras.

20. A non-transitory computer-readable medium having instructions stored thereon that, when executed by one or more processors, causes the one or more processors to perform operations comprising:

receiving a point cloud and a plurality of images with respect to a scene captured by a plurality of sensors associated with a vehicle as the vehicle moves along a trajectory;

segmenting the point cloud into a plurality of segments each associated with a start point and an end point on the trajectory of the vehicle;

associating each segment of the point cloud with one or more of the plurality of images based on the start point and the end point; and generating color point cloud by aggregating each segment of the point cloud and the one or more of the plurality of images based on calibration parameter in different distances between the segment of the point cloud and the vehicle.

* * * * *